United States Patent [19]

Yamamoto et al.

[11] 4,443,128
[45] Apr. 17, 1984

[54] FIXING DEVICE HAVING TWO PIVOTALLY INTERCONNECTED CLAMPS

[75] Inventors: Toshiharu Yamamoto, Yokohama; Koichiro Nakatani, Tokyo, both of Japan

[73] Assignees: Victor Company of Japan, Limited, Yokohama; Nihon Velbon Seiki Kogyo Kabushiki Kaisha, Tokyo, both of Japan

[21] Appl. No.: 282,171

[22] Filed: Jul. 10, 1981

[30] Foreign Application Priority Data

Jul. 11, 1980 [JP] Japan .............................. 55-96981[U]

[51] Int. Cl.³ .......................... B25G 3/36; E04G 7/00
[52] U.S. Cl. .................................... 403/385; 403/388
[58] Field of Search ............... 403/385, 386, 91, 374, 403/388; 248/229

[56] References Cited

U.S. PATENT DOCUMENTS

| 461,069 | 10/1891 | Caspar | 403/386 |
| 2,165,221 | 7/1939 | Burton | 403/286 |
| 2,679,413 | 5/1954 | Johnson | 403/385 |
| 2,825,591 | 3/1958 | Mulder | 403/374 |
| 4,025,213 | 5/1977 | Schäfer et al. | 403/374 X |
| 4,275,872 | 6/1981 | Mullin | 403/385 X |

FOREIGN PATENT DOCUMENTS

| 507702 | 12/1951 | Belgium | 403/385 |
| 2619200 | 11/1977 | Fed. Rep. of Germany | 403/385 |
| 1233609 | 5/1960 | France | 403/385 |
| 18557 | of 1901 | United Kingdom | 403/385 |
| 409318 | 5/1934 | United Kingdom . | |
| 436959 | 11/1935 | United Kingdom . | |
| 642081 | 8/1950 | United Kingdom . | |
| 1246074 | 9/1971 | United Kingdom . | |
| 1346725 | 2/1974 | United Kingdom . | |
| 1480167 | 7/1977 | United Kingdom . | |

*Primary Examiner*—Wayne L. Shedd
*Attorney, Agent, or Firm*—Lowe, King, Price & Becker

[57] ABSTRACT

A fixing device comprising a first clamp for clamping a mount and a second clamp which is adapted to be clamped to a stationary member. The second clamp is operatively connected to the first clamp by a tubular coupling member so that each clamp may be manually rotatable about an axis which is substantially perpendicular to the axial direction of each of the clamps. The clamps are held in position by a bolt-and-nut arrangement extending through the tubular member.

5 Claims, 2 Drawing Figures

FIXING DEVICE HAVING TWO PIVOTALLY INTERCONNECTED CLAMPS

BACKGROUND OF THE INVENTION

The present invention relates to a fixing device for fixing a video camera or the like to a stationary support in a desired elevational and azimuth angular position.

Tripods are conventionally used for supporting a video camera or the like in a desired position for videotaping outdoor activities. However, for this purpose the tripod is too bulky to be carried with the camera and other equipment and adds extra weight to the whole equipment which must be carried from place to place during family trips.

To eliminate the need for the above tripod a fixing device has been developed. The known fixing device comprises a single clamp adapted to be clamped to a vertical support and a mounting base adapted to threadably engage with the video camera or the like. The mounting base is operatively connected to the clamp and held in a desired elevational angular position with a thumbscrew. This type of fixing device, however, is not capable of clamping itself to a horizontal bar or any other tilted support while permitting the camera to be oriented in a desired position. This is inconvenient for outdoor recreational activities.

SUMMARY OF THE INVENTION

Accordingly, an object of the present invention is to provide a fixing device having two pivotally interconnected clamps permitting greater freedom of orientation than is possible with known devices.

Another object of the invention is to provide a fixing device which is easy to disassemble for storage in any available space of a traveling bag.

In accordance with the invention, the fixing device comprises a first clamp for clamping a mount in a desired angular and axial position and a second clamp adapted to be clamped to a stationary member. Means is provided for coupling the first and second clamps so that they can be manually pivotable with respect to each other about an axis that is substantially perpendicular to the axial direction of each of the clamps. Means is also provided for holding the first and second clamps in position.

Preferably, each first and second clamps is formed with a throughbore extending in a direction substantially perpendicular to the axial direction of each clamp. Each throughbore is axially aligned with the throughbore of the other clamp and generally tapered in a direction toward the other clamp. Preferably, the coupling means comprises a tubular member received in the aligned throughbores. The member includes a circumferentially segmented portion at each end thereof. The holding means preferably comprises a bolt-and-nut arrangement extending through the tubular member and means having surfaces tapered correspondingly to the tapered inner walls of the aligned throughbores for spreading the segments of the segmented portions apart to press them against the inner walls of the throughbores when the bolt-and-nut arrangement is tightened.

A video camera or the like is fixed to the mount which in turn is fixed to the first clamp. The position of the mounted equipment can be adjusted both in elevational and azimuth orientations by loosening the first clamp and the bolt-and-nut arrangement, respectively.

In a further preferred embodiment the tubular member has a knurled outside wall for making frictional contact with the inner wall of the aligned throughbores so that the pivotally interconnected clamps are frictionally coupled when the bolt-and-nut arrangement is loosened for readjustment.

From manufacturing and handling standpoints the pivotally interconnected clamps are preferably of identical construction.

BRIEF DESCRIPTION OF THE DRAWINGS

The invention will be further described by way of example given in reference to the accompanying drawings, in which.

DETAILED DESCRIPTION

Figure 1:
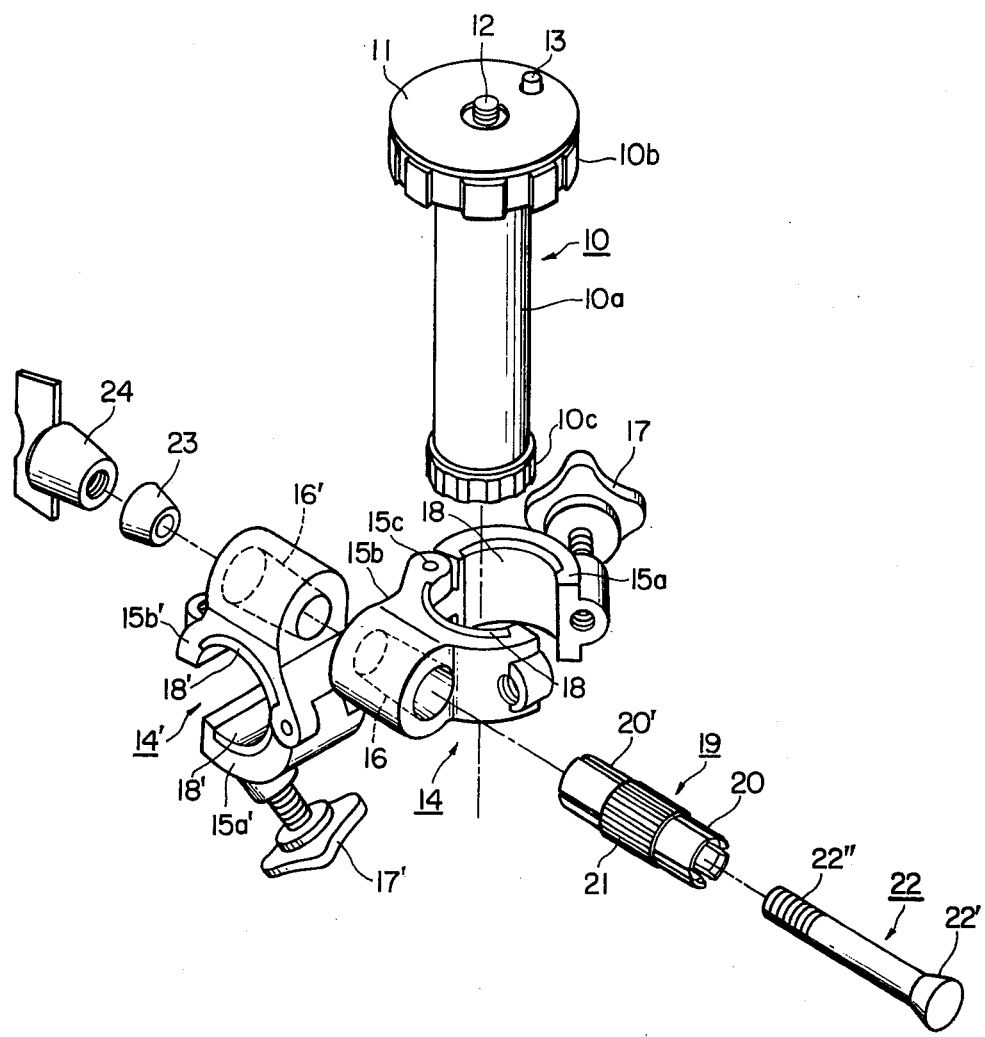
FIG. 1 is an exploded view of the fixing device of the invention with a mount shown in a vertical position.

In FIG. 1, a fixing device of the invention generally comprises a mount 10, a pair of identically constructed first and second clamps 14 and 14', and a fastening means including elements 19, 22, 23, 24 which couples clamps 14 together and 14' and holds them firmly in a desired relative angular position. Mount 10 comprises a cylindrical shaft 10a integrally connected to a base 10b and a rotary disk 10c. Base 10b having a pad 11 thereon is formed with a lug 13 adapted to engage a notch provided in an article, such as a video camera. A screw 12, connected to rotary disk 10c, extends through shaft 10a for threaded engagement with an internally threaded portion of the article. By manually turning the disk 10c with respect to shaft 10a, base 10b is tightened against the bottom of the article.

First clamp 14 comprises two clamping members 15a and 15b of part-cylindrical structure which are pivotally interconnected at 15c. Member 15a includes a thumbscrew 17 arranged to threadedly engage the other member 15b to hold the shaft 10 firmly in a desired angular and axial position. Each clamping member has a semi-cylindrical inner wall surface covered with a pad or elastic protective layer 18, such as synthetic resin, to protect the contacting surfaces. Clamping member 15b is formed with a throughbore 16 which extends perpendicular to the vertical axis of clamped shaft 10a. Throughbore 16 is generally tapered in the direction of second clamp 14'. Clamp 14' is to the first clamp (corresponding parts being indicated by prime numerals). Second clamp 14' is positioned so that its throughbore 16' is aligned with throughbore 16 of the first clamp 14. Throughbore 16' is and generally tapered in the direction of the first clamp 14. Clamping members 15a' and 15b' are oriented to hold therebetween a suitable stationary cylindrical shaft, described below, which may be inclined at an angle to the vertical.

A tubular coupling member 19 is provided to fasten clamps to 14, 14' together, and includes an axially knurled center portion 21 and a plurality of axially slited, circumferentially divided segments 20 and 20' on opposite ends thereof. Segmented portions 20, if desired, 20' may extend over the length of the remainder of tubular coupling member 19. The smaller diameter portions of the throughbores 16, 16' are dimensioned so as to frictionally receive knurled center portion 21 of tubular member 19 to provide a frictional coupling between first and second clamps 14, 14' so that they retain their relative angular position for easy assemblage. With coupling member 19 being received in aligned throughbores 16, 16', a bolt 22 is inserted into tubular member 19. Bolt 22 is formed with an externally threaded portion 22" (for engaging a thumbnut 24) and a bolt head 22' which is tapered toward threaded portion 22" so that the tapered bolt head spreads axially slited segments 20 apart in radial directions when bolt 22 is positioned fully inside coupling member 19 by thumbnut 24. Axially slited segments 20', on the other hand, are radially spread apart by means of a truncated conical ring 23 when the latter is pushed into tube 19 by thumbnut 24. By tightening thumbnut 24 both segments 20, 20' are pressed against the inner wall of throughbores 16, 16' thereby firmly holding the first and second clamps 14, 14'. By loosening thumbhut 24, clamps 14, 14' can be manually rotated with respect to each other to a desired angular position.

Figure 2:
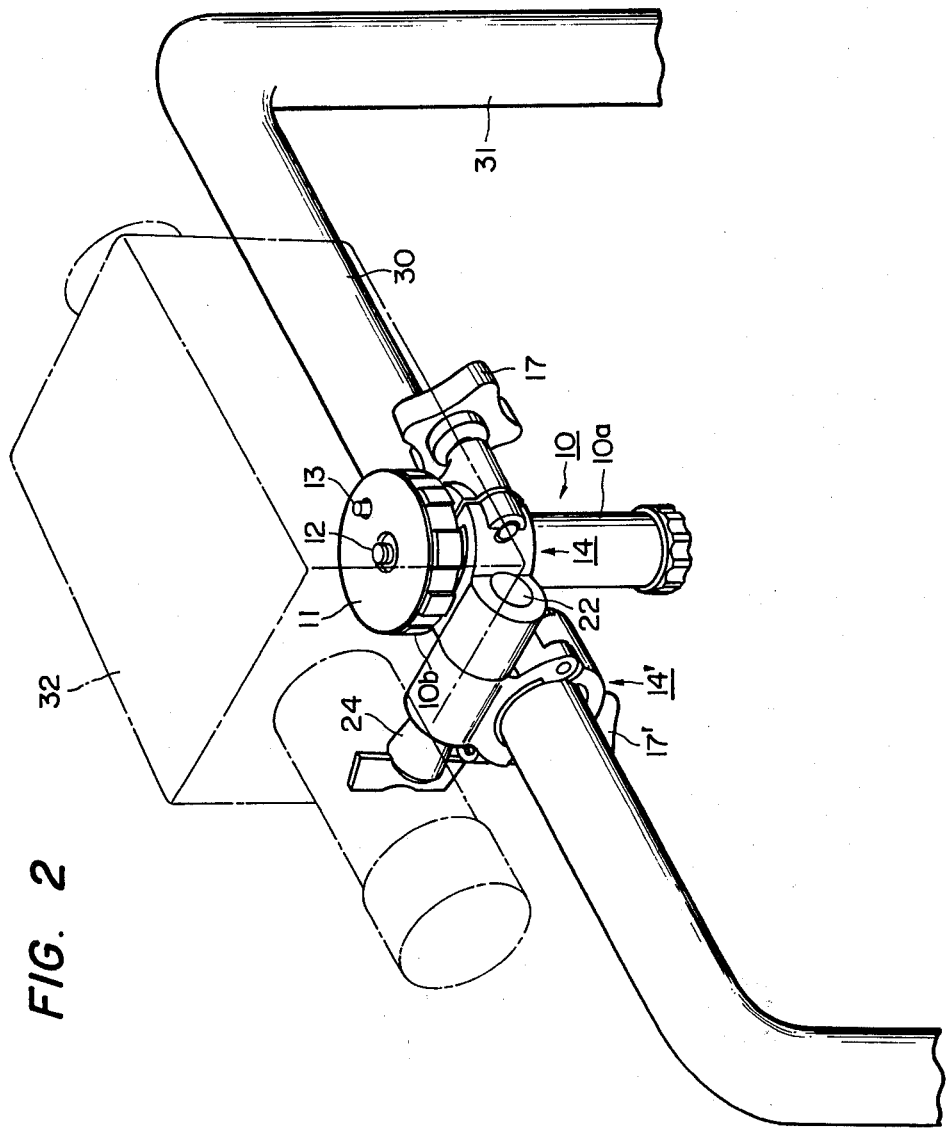
FIG. 2 is an exemplary illustration of the fixing device attached to a horizontal bar with a video camera shown in chain-dot-line.

As illustrated in FIG. 2, first and second clamps 14, 14' can be secured together at right-angles to each other so that mount 10 is clamped in a desired vertical position by first clamp 14 with a video camera 32 being fixed atop the mount 10. Second clamp 14' is clamped to a horizontal shaft 30 of a framed structure (e.g., a baby carriage) or one that is located in a convenient place. Since clamps 14 and 14' can be adjusted to any relative angular position, the second clamp can be clamped to a tilted post or a vertical shaft 31 of the frame structure (not shown in detail), while maintaining mount 10 in its desired position. Once the fixing device is properly attached to a stationary support with clamp 14', video camera 32 can be adjusted to any desired angle of elevation by loosening thumbnut 24 and to any desired azimuth and vertical position by loosening thumbscrew 17.

As seen from the foregoing the fixing device of the present invention provides a greater freedom of orientation than is possible with known devices. Further, the fixing device can be easily disassembled and packed in any space available (e.g. a traveling bag) before starting a trip, for easy assembly at the destination.

What is claimed is:

1. The device of claim 5, wherein said coupling means includes a tubular member received in said aligned throughbores and having a circumferentially segmented portion at opposite ends thereof, said tightening means including a bolt-and-nut arrangement extending through said tubular member and said tapered surface of each said pair of members engaging and spreading the segments of said segmented portions apart and pressing the segments against the inner walls of said throughbores when said bolt-and-nut arrangement is tightened.

2. A fixing device as claimed in claim 2, wherein said tubular member includes a knurled outside wall that frictionally engages with the inner wall of each aligned throughbore so that said first and second clamps retain their relative angular position with each other during assembly.

3. A fixing device as claimed in claim 1 or 2, wherein said first and second clamps are of identical construction.

4. A fixing device as claimed in claim 3, wherein each first and second clamp includes a pair of semi-cylindrical, pivotally interconnected members, said first clamping means and adjustable clamping means each being a thumbscrew for coupling said two members together in clamping engagement.

5. A holding device for mounting an article in a substantially stationary position relative to a support member, comprising:
 (a) a first clamp having an axially extending opening and clamping means connected to the first clamp that clamps a mount received in said opening, said mount having a mounting surface receiving and supporting the article;
 (b) a second clamp having an axially extending opening receiving the support member, said second clamp including adjustable clamping means selectively clamping the second clamp in a desired angular and axial position relative to the support member;
 (c) coupling means engaging each said first and second clamps connecting said first and second clamps together, said coupling means enabling manual pivoting movement of the first and second clamps with respect to each other about a coupling axis substantially perpendicular to axial directions of said first and second clamps; and
 (d) selective tightening means connected to said coupling means holding the first and second clamps in fixed positions relative to each other;
wherein each first and second clamp is formed with a throughbore extending in a direction substantially perpendicular to the axial direction of each clamp, each throughbore being selectively positioned in axial alignment with the other throughbore coupling the clamps together with said coupling means and being generally tapered in a direction toward the other clamp, said tightening means including a pair of members each having a tapered surface corresponding to a tapered inner wall of said aligned throughbores pressing portions of the coupling means against the inner walls of said throughbores when said tightening means is tightened.

* * * * *